United States Patent
Iwata

(10) Patent No.: US 9,292,062 B2
(45) Date of Patent: Mar. 22, 2016

(54) POWER SUPPLY AND PROGRAM TO ACQUIRE VIRTUAL MACHINE DATA

(71) Applicant: Sanken Electric Co., Ltd., Niiza-shi, Saitama (JP)

(72) Inventor: Tetsuki Iwata, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 366 days.

(21) Appl. No.: 13/913,589

(22) Filed: Jun. 10, 2013

(65) Prior Publication Data

US 2013/0332752 A1 Dec. 12, 2013

(30) Foreign Application Priority Data

Jun. 11, 2012 (JP) .................................. 2012-131517

(51) Int. Cl.
*G06F 1/26* (2006.01)
*G06F 1/32* (2006.01)
*G06F 9/50* (2006.01)

(52) U.S. Cl.
CPC ............... *G06F 1/26* (2013.01); *G06F 1/3206* (2013.01); *G06F 9/5077* (2013.01); *G06F 9/5094* (2013.01); *Y02B 60/142* (2013.01)

(58) Field of Classification Search
None
See application file for complete search history.

(56) References Cited

U.S. PATENT DOCUMENTS

| 2002/0083110 A1* | 6/2002 | Kozuch ................. G06F 1/3203 718/1 |
| 2010/0250160 A1* | 9/2010 | Spitaels et al. .................. 702/61 |
| 2012/0036383 A1 | 2/2012 | Iwata |
| 2012/0102492 A1* | 4/2012 | Iwata ............................... 718/1 |

FOREIGN PATENT DOCUMENTS

| JP | 2008-269249 A | 11/2008 |
| JP | 2012-038157 A | 2/2012 |

OTHER PUBLICATIONS

Oaks, Scott, and Henry Wong. "Thread Creation and Management." In Java Threads, 35-39. 3rd ed. Beijing: O'Reilly, 2009.*
IBM Corporation.; "What is Power Chute Network Shutdown (SCNS)"; IMG Systems Group—Japan, Japan (2011).

* cited by examiner

*Primary Examiner* — Michael J Brown
*Assistant Examiner* — Joshua Neveln
(74) *Attorney, Agent, or Firm* — Mots Law, PLLC

(57) ABSTRACT

A power supply includes a virtual machine state acquisition unit and a virtual machine management unit. The virtual machine state acquisition unit is configured to: send each of the virtual host computers in virtual host list data a request to acquire information on a virtual machine run in emulation by the virtual host computer; acquire, from each of the virtual host computers, the information on the virtual machine run in emulation by the virtual host computer; and create virtual machine management data in which an identifier of the virtual host computer, an identifier of the virtual machine thereof, and the acquired information on the virtual machine are associated with each other. The virtual machine management unit is configured to read the virtual machine management data and input a command related to a virtual power source of the virtual machine.

6 Claims, 7 Drawing Sheets

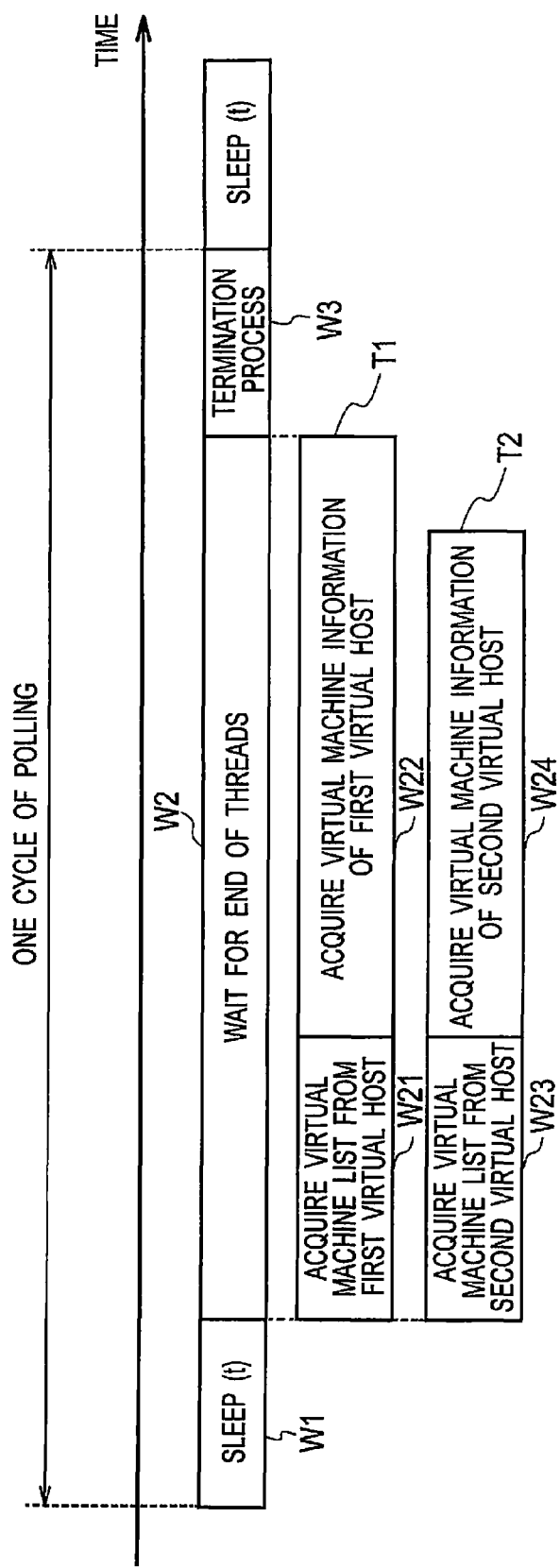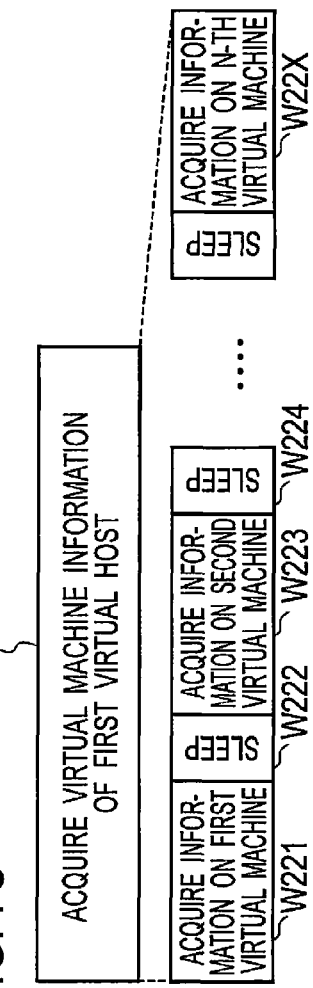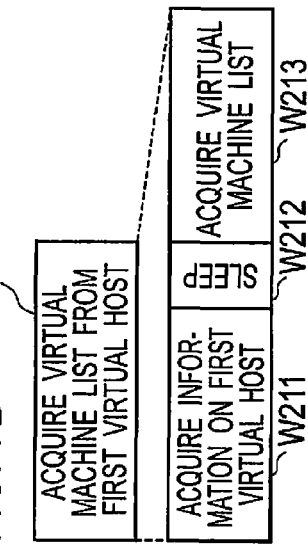

POWER SUPPLY AND PROGRAM TO ACQUIRE VIRTUAL MACHINE DATA

CROSS-REFERENCE TO RELATED APPLICATIONS

This application is based upon and claims the benefit of priority from the prior Japanese Patent Application No. 2012-131517 (filed Jun. 11, 2012); the entire contents of which are incorporated herein by reference.

BACKGROUND OF THE INVENTION

1. Field of the Invention

The present invention relates to a power supply and a program for feeding power to virtual host computers each running a virtual machine in emulation, the virtual machine controlled by a virtualization management server.

2. Description of the Related Art

Virtualization management is generally used for effective utilization of the resources of physical computers. The virtualization management uses the physical computers as virtual hosts. Each virtual host is configured to run one or multiple virtual machines (VMs) in emulation. In the virtualization management, a VM is sometimes migrated to a different virtual host depending upon the running situations of the VMs. Using a structure that allows flexible migration of a VM to any virtual host makes it possible to effectively utilize the resources of the physical computers.

Meanwhile, there are methods that use a power control device to reduce the power consumption of the physical computers (see Japanese Patent Application Publication No. 2008-269249, for example). In the method described in Japanese Patent Application Publication No. 2008-269249, the power control device collects the load statuses of systems, migrates a system to a given physical computer on the basis of the load statuses, and turns off the power of the unselected physical computer. By causing the power control device to perform both virtualization management and power management as described above, the power consumption of the physical computers can be expected to be reduced.

However, the method described in Japanese Patent Application Publication No. 2008-269249 has a problem that the power control device becomes unable to perform not only the power management but also the virtualization management if there is a power fault in the power supply feeding power to the power control device.

In view of such a circumstance, a power supply configured to perform virtualization management of VMs and power management of the VMs and their virtual hosts has been proposed (see Japanese Patent Application Publication No. 2012-038157). According to the method described in Japanese Patent Application Publication No. 2012-038157, the power supply manages so as to perform the virtualization management and the power feed in conjunction with each other in accordance with preset schedule data. Thus, the system can be operated stably.

Moreover, there is a configuration using POWER-CHUTE™ Network Shutdown (PCNS) or the like in a general virtual system for the purpose of power control (see IBM Japan, Ltd. "IBM UPS Management in VMware ESX/ESXi 4.x Environment", Page 5 "What is POWERCHUTE™ Network Shutdown (PCNS)?", [online], 2011, IBM Japan, Ltd., [searched May 17, 2012], and an IBM document obtained from the Internet (hereinafter, Non-patent Document), for example). When power feed to an UPS is stopped due to a power failure, computers fed with power from this UPS must be shut down while the battery of the UPS feeds power. Thus, in the method described in Non-patent Document, when power feed to an UPS is stopped due to a power failure, the power supply notifies a PCNS on the service console of a virtual system that the power feed has been stopped. Then, to start a shutdown, a virtual host computer shuts down the guest OS of each VM. Once the shutdown of the guest OS is complete, the virtual host computer shuts down. Such a PCNS is installed and executed on a VM in some cases.

SUMMARY OF THE INVENTION

However, there are cases where even the invention described in Japanese Patent Application Publication No. 2012-038157 or the technique described in Non-patent Document cannot run VMs appropriately.

When a power failure occurs, general power supplies notify each information apparatus of the occurrence of the power failure. Upon receipt of the notification of the occurrence of the power failure, the information apparatus shuts down so as to protect data therein.

This method has been employed in virtual systems as well. There are cases where a power supply notifies its virtual host computer of the occurrence of a power failure and shuts down the virtual host computer. Meanwhile, in the case of feeding power to computers whose virtualization management is performed by a virtualization management server or in the case of using PCNS as described in Non-patent Document, the virtualization management server or the PCNS shuts down VMs. For this reason, there is a problem that the timings to execute commands for the running of the power supply and for a shutdown of the virtualization management or PCNS cannot be coordinated in conjunction with each other.

Specifically, because the PCNS is executed on a VM, it is possible that the PCNS does not run normally due to stop, reboot, migration or the like of the VM executing the PCNS. In this case, the PCNS may fail to appropriately shut down the VM, and steps to shut down the VM are complicated as well. Moreover, because it is necessary to run a VM for the PCSN, such a system may not utilize resources effectively.

In this respect, there has been a demand for the development of a technique which allows a power supply to control a shutdown of each of VMs. However, because the virtualization management server controls migration and running of VMs, the power supply cannot acquire such information, thus leading to a problem that the VMs cannot be run stably.

In view of the above circumstances, there has been a demand for the development of a technique that improves the reliability of virtualization management.

Thus, an object of the present invention is to provide a power supply and a program capable of improving the reliability of virtualization management.

To solve the above problems, a first aspect of the present invention relates to a power supply which feeds power to virtual host computers each running a virtual machine in emulation, the virtual machine controlled by a virtualization management server. Specifically, the power supply according to the first aspect of the present invention includes: a storage device configured to store virtual host list data containing an identifier of each of the virtual host computers fed with power from the power supply; a virtual machine state acquisition unit configured to send each of the virtual host computers in the virtual host list data a request to acquire information on the virtual machine run in emulation by the virtual host computer, acquire, from each of the virtual host computers, the information on the virtual machine run in emulation by the virtual host computer, and create virtual machine management data in which the identifier of the virtual host computer, an identifier of the virtual machine thereof, and the acquired information on the virtual machine are associated with each other; and a virtual machine management unit configured to read the virtual machine management data and input a command related to a virtual power source of the virtual machine.

A second aspect of the present invention relates to a program being on a non-transitory computer-readable storage medium for a power supply which feeds power to virtual host computers each running a virtual machine in emulation, the virtual machine controlled by a virtualization management server. Specifically, the program according to the second aspect of the present invention is configured to execute the steps of: sending a request to acquire information on the virtual machine run in emulation by the virtual host computer found in virtual host list data, the virtual host list data containing an identifier of each of the virtual host computers fed with power; acquiring, from each of the virtual host computers, the information on the virtual machine run in emulation by the virtual host computer, and creating virtual machine management data in which the identifier of the virtual host computer, an identifier of the virtual machine thereof, and the acquired information on the virtual machine are associated with each other; and reading the virtual machine management data and inputting a command related to a virtual power source of the virtual machine.

BRIEF DESCRIPTION OF THE DRAWINGS

FIGS. 7A to 7C are diagrams describing one cycle of polling of the power supply according to the embodiment of the present invention.

DETAILED DESCRIPTION OF THE PREFERRED EMBODIMENTS

Figure 1A:
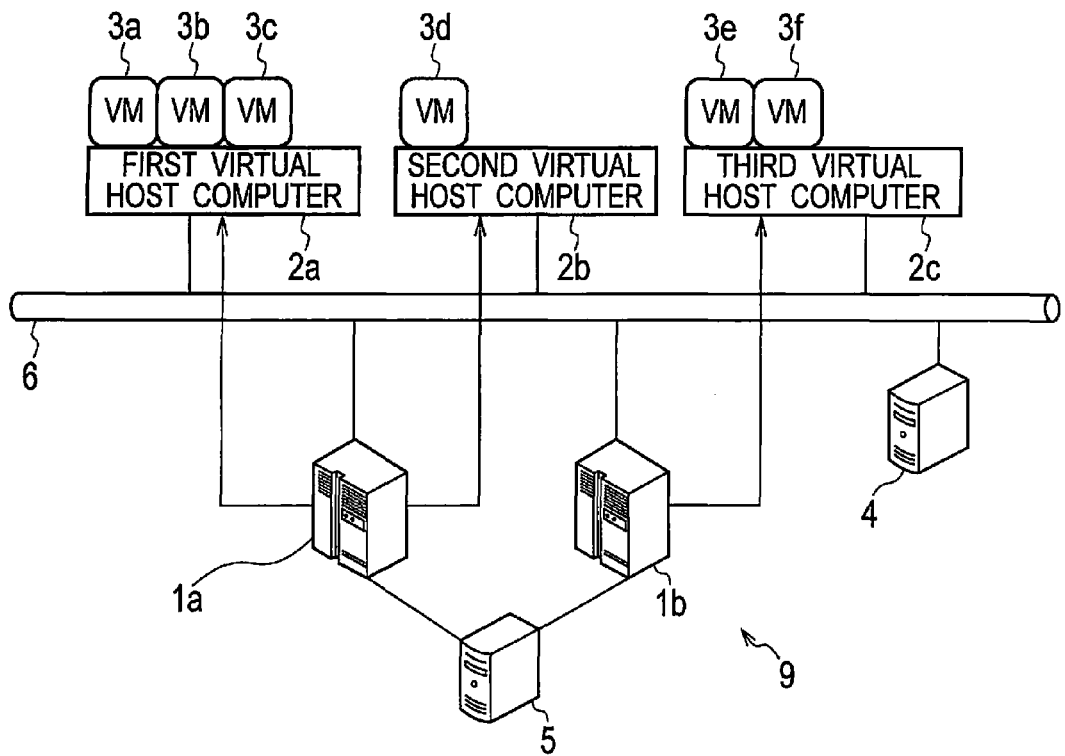
FIGS. 1A and 1B are diagrams describing the system configuration of a virtual system according to an embodiment of the present invention.

Embodiments of the present invention will be described next with reference to the drawings. In the following description of the drawings, the same or similar portions are denoted by the same or similar reference signs.

First of all, in the embodiments of the present invention, a "physical computer" is a general computer including a central processing unit (CPU), a storage device, and the like. Specifically, a "physical computer" is a computer such as a personal computer, a server, or a blade server. Moreover, a "virtual host computer (virtual host)" is implemented on a physical computer by executing a host OS on the physical computer. One virtual host can run one or more VMs. A "VM" is a virtual computer obtained by emulating another computer as software on one virtual host.

A "virtual system" includes a physical computer, a physical storage, a physical switch, a physical network, and the like. The whole virtual system functions as one or more VMs and virtual storages. "Virtualization management" manages virtual infrastructures constructing a virtual system and controls the running of one or more VMs.

Commands for a virtual host include "shutdown," "reboot," "power on," "power off," and the like. "Shutdown" is to cause a virtual host OS running on a physical computer to transition to a state where power feed to the virtual host OS can be stopped through a predetermined procedure. "Reboot" is to shut down and boot again a virtual host OS running on a physical computer through a predetermined procedure. "Power on" is to power on a physical computer that runs a virtual host, and to run a virtual host OS.

Commands for a VM include "shutdown," "reboot," "power on," "power off," and the like. "Shutdown" is to cause a guest OS installed in a VM to transition to a state where resources such as a CPU and a memory allocated to the VM can be freed. "Reboot" is to shut down and boot a VM again. "Power on" is to use resources such as a CPU and a memory allocated to a VM so as to run this VM. "Power off" is to free resources such a CPU and a memory allocated to a VM. Meanwhile, if a shutdown of a VM does not end normally, a "power off" may be performed for a force-quit.

A "power supply" is an apparatus configured to feed power to virtual infrastructures, as well as to measure and cut the power. Specifically, a "power supply" is an alternating current (AC) power supply, a direct current (DC) power supply, an uninterruptible power supply (UPS), a power distribution unit (PDU), or the like.

A "virtual power source" is a source of power necessary for a CPU and a memory to run a VM in a virtual host computer. A virtual power source is a power source that feeds a part of power, fed from a physical power supply to its virtual host, for use in a given VM.

"Power management" is control that allows stable feed of power to infrastructures. Power management in the embodiments of the present invention refers to such a function that a power supply automatically shuts down infrastructures such as computers to protect the services and data of the computers in the event of inspection of power equipment or a power fault.

(Virtual System)

Referring to FIG. 1A, description will be given of a virtual system 9 according to an embodiment of the present invention. The virtual system 9 includes a first power supply 1a, a second power supply 1b, a first virtual host computer 2a, a second virtual host computer 2b, a third virtual host computer 2c, a first VM 3a, a second VM 3b, a third VM 3c, a fourth VM 3d, a fifth VM 3e, a sixth VM 3f, a virtualization management server 4, and a power management apparatus 5. The first power supply 1a, the second power supply 1b, the first virtual host computer 2a, the second virtual host computer 2b, the third virtual host computer 2c, the first VM 3a, the second VM 3b, the third VM 3c, the fourth VM 3d, the fifth VM 3e, the sixth VM 3f, and the virtualization management server 4, are connected by a communication network 6 in such a way as to be capable of mutual communications. The example shown in FIG. 1A describes a case where the power management apparatus 5 is connected to first power supply 1a and the second power supply 1b in such a way as to be capable of mutual communications. However, the power management apparatus 5 may be connected to the other apparatuses by the communication network 6 in such a way as to be capable of communications.

In this embodiment, the first virtual host computer 2a, the second virtual host computer 2b, and the third virtual host computer 2c may sometimes be described simply as virtual host computer(s) 2 when they are not distinguished from each from one another. Moreover, the virtual host computer(s) 2 may sometimes be described simply as virtual host(s) 2. The first VM 3a, the second VM 3b, the third VM 3c, the fourth VM 3d, the fifth VM 3e, and the sixth VM 3f may sometimes be described simply as VM(s) 3 when they are not distinguished from one another. The numbers of power supplies 1, virtual host computers 2, VMs 3, etc. are mere examples and are not limited to these examples.

The virtual system 9 shown in FIG. 1A includes multiple virtual host computers 2, and each of these virtual host computers 2 is configured to run one or more VMs 3 in emulation. Here, each virtual host computer 2 is a physical computer constituting a physical infrastructure. Each VM 3 is a virtual computer constituting a virtual infrastructure run in emulation by a virtual host computer 2.

Each virtual host 2 is implemented by installing a given program in a general physical computer. The virtual host 2 is configured to run a VM(s) 3 in emulation. In FIG. 1A, the first virtual host 2a runs the first VM 3a, the second VM 3b, and the third VM 3c in emulation; the second virtual host 2b runs the fourth VM 3d in emulation; the third virtual host 2c runs the fifth VM 3e and the sixth VM 3f in emulation.

In the virtual system 9 shown in FIG. 1A, the power supply 1 is configured to feed power to the virtual host computer 2 running the VM 3 in emulation, the VM 3 controlled by the virtualization management server 4. Further, the power supply 1 is configured to manage the virtual power source of the VM 3 run in emulation by the virtual host 2. The targets of the power feed of the first power supply 1a are the first virtual host 2a and the second virtual host 2b, and the first power supply 1a therefore manages the virtual power sources of the first VM 3a, the second VM 3b, the third VM 3c, and the fourth VM 3d. The target of the power feed of the second power supply 1b is the third virtual host 2c, and the second power supply 1b therefore manages the virtual power sources of the fifth VM 3e and the sixth VM 3f.

The power management apparatus 5 is a computer configured to operate the power supplies 1. The power management apparatus 5 is implemented by a general computer executing a predetermined program. The power management apparatus 5 is configured to input commands to the power supplies 1, display information on the power supplies 1, and perform data processing related to input and output of the commands and information.

The virtualization management server 4 is configured to execute virtualization management of the VMs 3 shown in FIG. 1A such as migration and resource allocation. Here, in the embodiment of the present invention, it is not the virtualization management server 4 but the power supplies 1 that control virtual power sources for a boot and shutdown of the VMs.

Figure 1B:
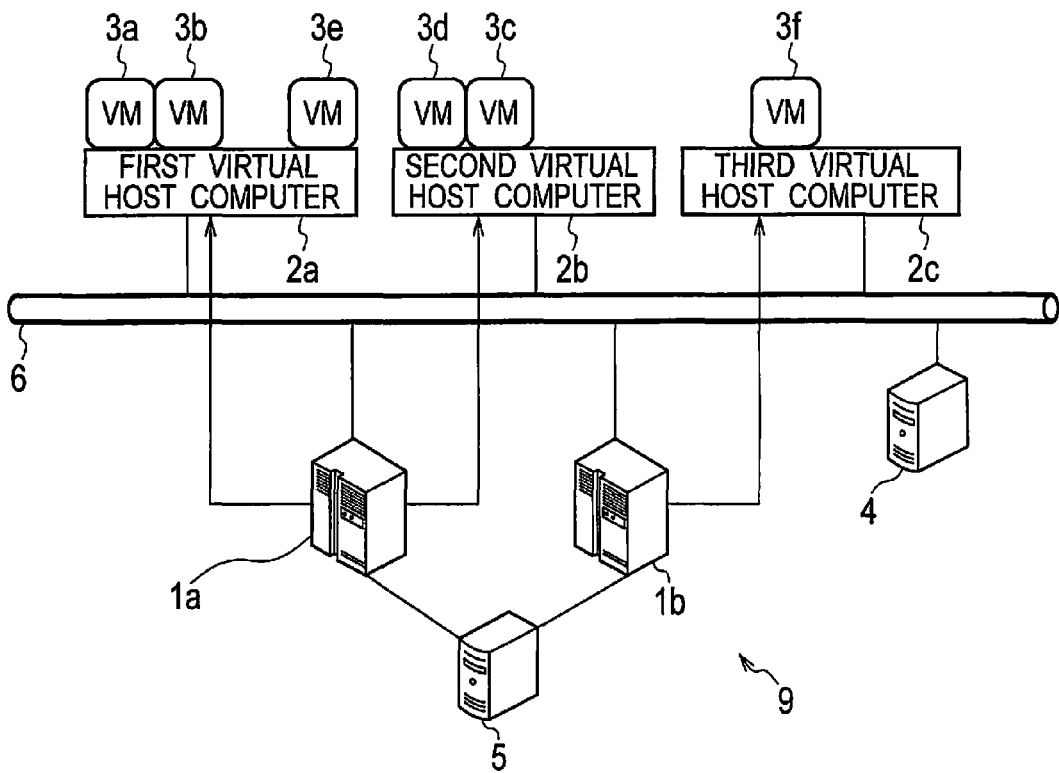

Description will be given of the virtual system 9 in which VMs 3 have been migrated by the virtualization management server 4. In the virtual system 9 shown in FIG. 1B, the third VM 3c and the fifth VM 3e have been migrated. The third VM 3c is run in emulation by the first virtual host 2a in FIG. 1A but is run in emulation by the second virtual host 2b in FIG. 1B. The fifth VM 3e is run in emulation by the third virtual host 2c in FIG. 1A but is run in emulation by the first virtual host 2a in FIG. 1B. The embodiment of the present invention assumes that the virtualization management server 4 instructs the migration of these VMs 3.

Each power supply 1 according to the embodiment of the present invention detects migration of a VM 3 performed under the control of an apparatus other than the power supply 1. The power supply 1 controls the virtual power source of its VM 3 and the physical power source of its virtual host 2 in conjunction with each other on the basis of the association between the VM 3 and the virtual host 2. This contributes to improvement in the reliability of the virtualization management.

(Virtual Host Computer)

Figure 2:
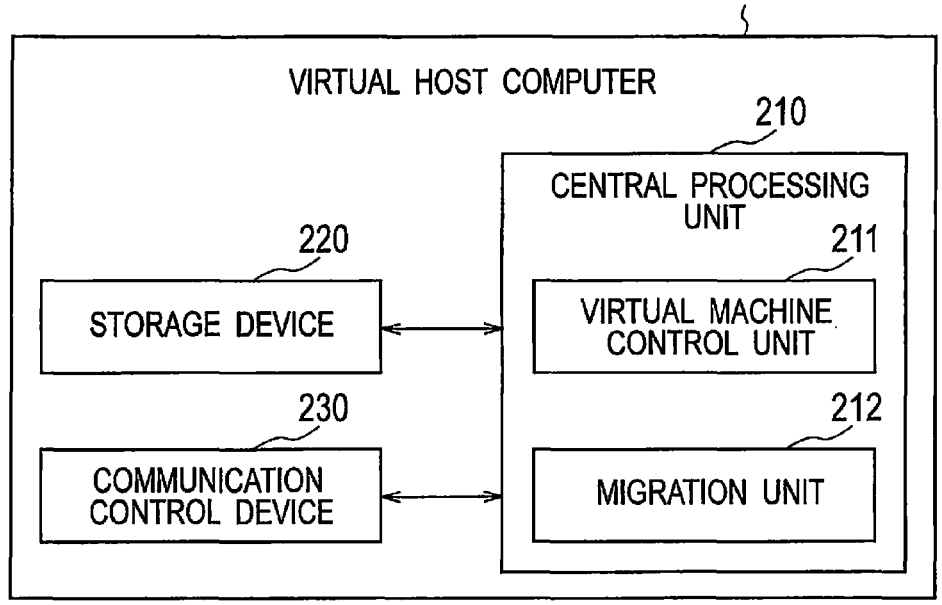
FIG. 2 is a diagram describing the functional blocks of each virtual host computer according to the embodiment of the present invention.

Referring to FIG. 2, description will be given of each virtual host computer 2 according to the embodiment of the present invention. Each virtual host computer 2 is a general computer including a central processing unit 210, a storage device 220, and a communication control device 230. A host OS for controlling VMs is installed in the virtual host computer 2. The storage device 220 may be formed of multiple storage devices. Likewise, the central processing unit 210 may be formed of multiple central processing units as well. Further, the storage device 220 may be a shared disk to which multiple virtual host computers can be connected.

The storage device 220 is a storage medium configured to store data related to processing in the central processing unit 210, and is a hard disk drive, for example. The communication control device 230 is a device configured to communicate with other computers and power supplies, a shared disk, and so on, and is an LAN adaptor, a fibre-channel SAN (FC-SAN), or the like, for example.

By the installation of the host OS or the like, the central processing unit 210 implements a VM control unit 211 and a migration unit 212.

The VM control unit 211 is a unit configured to control each VM 3 run in emulation by the virtual host computer 2. The VM control unit 211 controls each of the VMs 3 through allocation of resources to the VMs 3 and the like, for example. In the embodiment of the present invention in particular, the VM control unit 211 controls migration of the VMs 3 in accordance with instructions from the virtualization management server 4.

The migration unit 212 is a unit configured to migrate a VM 3 to a different virtual host computer 2. In the embodiment of the present invention, the migration unit 212 migrates a VM 3 on the basis of a migration request inputted from the virtualization management server 4. The embodiment of the present invention is not particularly limited about its specific means for controlling and migrating a VM 3.

(Power Supply)

Figure 3:
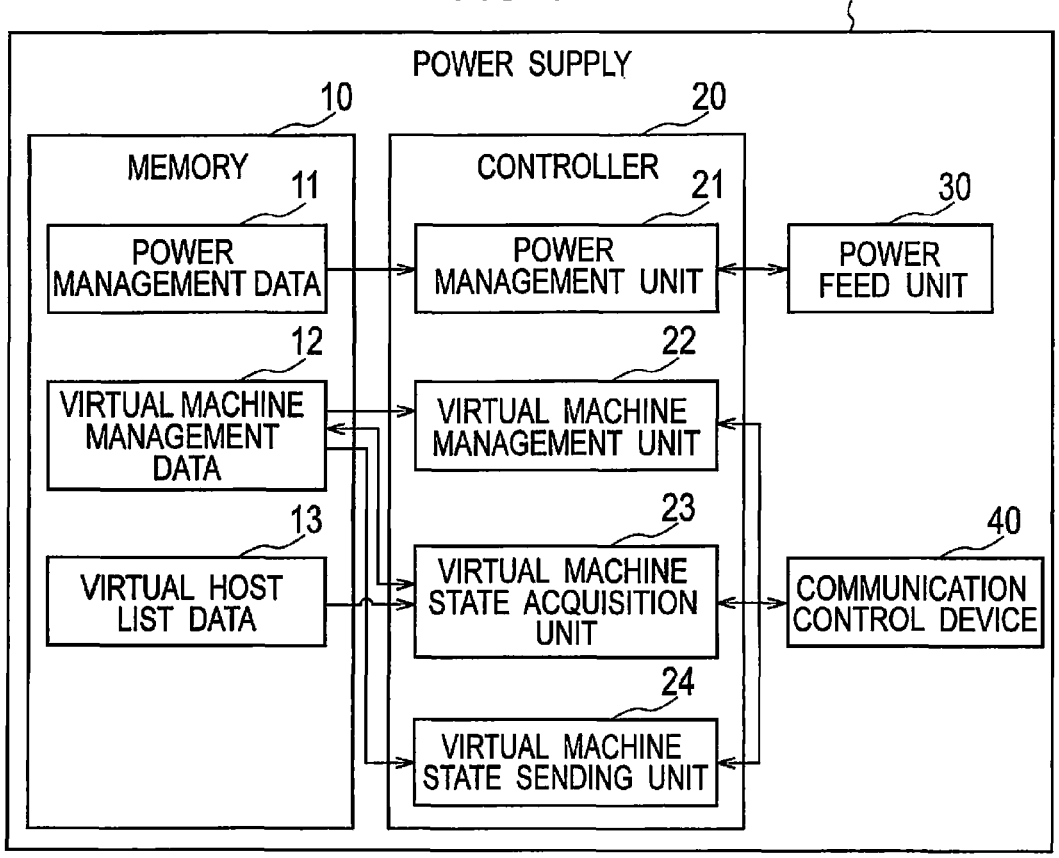
FIG. 3 is a diagram describing the hardware configuration and functional blocks of each power supply according to the embodiment of the present invention.

Referring to FIG. 3, description will be given of each power supply 1 according to the embodiment of the present invention. The power supply 1 includes a memory 10, a controller 20, a power feed unit 30, and a communication control device 40.

The power feed unit 30 is configured to feed power to each virtual host computer 2 connected to the power supply 1. The power feed unit 30 includes multiple outlets and is capable of feeding power to multiple virtual host computers 2. In the example shown in FIG. 1A, the first power supply 1a includes at least two outlets, and the second power supply 1b includes at least one outlet.

The communication control device 40 is a device configured to communicate with other power supplies and information apparatuses, and is an LAN adapter, for example. In the example shown in FIG. 1A, the communication control device 40 is capable of mutual communications with the virtual hosts 2 via the communication network 6, and is also capable of mutual communications with the power management apparatus 5.

The memory 10 is a storage device configured to accumulate: program data of a firmware program and the like that are executed on the power supply 1; data to be processed by the controller 20; and the like. The memory 10 has a storage area for the program data and also stores power management data 11, VM management data 12, and virtual host list data 13. The embodiment of the present invention will describe a case where the memory 10 of the power supply 1 stores the pieces of data; however, these pieces of data are not necessarily stored in the memory 10 incorporated in the power supply 1. For example, the pieces of data may be stored in an external storage unit such as a computer's hard disk drive or semiconductor memory from which the power supply 1 can read data.

The power management data 11 is data storing setting information on power to be fed to each virtual host 2. In the power management data 11, an identifier of each outlet, an identifier of the virtual host 2 to which power is fed from that outlet, and setting information for that power feed are associated with each other. Here, the "setting information for that power feed" is the type of power feed, input voltage, input frequency, output voltage, output frequency, etc. However, these are mere examples, and other information may be contained.

The VM management data 12 is data on the VM run in emulation by the virtual host 2 fed with power from the power supply 1. The VM management data 12 is data acquired by a VM state acquisition unit 23 described later from each virtual host 2 or from each VM 3.

Figure 4:
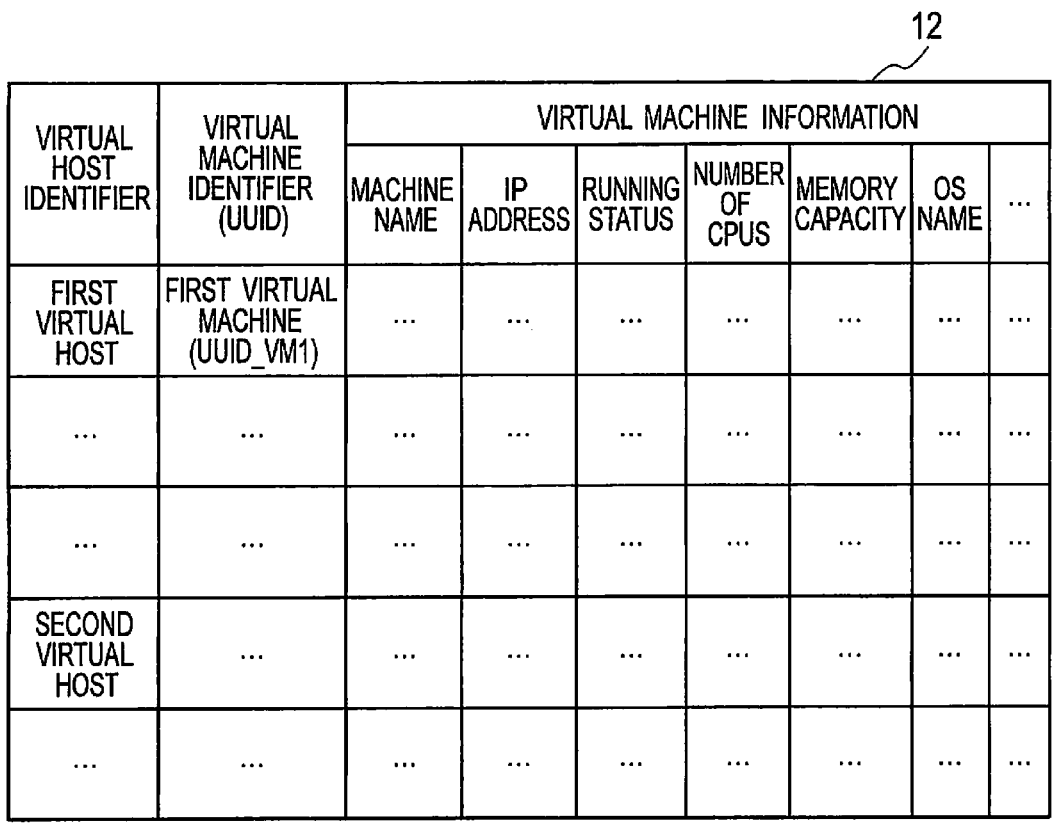
FIG. 4 is a diagram describing an example of the data structure and data contents of VM management data in the power supply according to the embodiment of the present invention.

The VM management data 12 is data shown in FIG. 4, for example. The VM management data 12 shown in FIG. 4 is data in which the identifier of each virtual host, an identifier of each VM run in emulation by this virtual host, and VM information on this VM are associated with each other.

The virtual host identifier is the machine name, IP address, or the like of the virtual host 2. The VM identifier is the machine name, IP address, UUID, or the like of the VM 3.

The VM information is data in which pieces of information are associated with each other, the pieces of information including the machine name and IP address of the VM 3, the running status of the VM 3 indicating, for example, whether or it is running or shut down, as well as the number of CPUs and the memory capacity allocated to the VM 3, the OS name of the VM, and so on. The VM management data 12 is information to be referred to by VM management unit 22 described later.

In the example shown in FIG. 1A, the first power supply 1a feeds power to the first virtual host 2a and the second virtual host 2b, and the first virtual host 2a runs the first VM 3a, the second VM 3b, and the third VM 3c in emulation. Thus, in the VM management data 12, the identifier of the first virtual host 2a is associated with the identifiers of the first VM 3a, the second VM 3b, and the third VM 3c and also with the VM information on these VMs 3. Further, in the VM management data 12, the identifier of the second virtual host 2b is associated with the identifier of the fourth VM 3d and also with the VM information on the fourth VM 3d.

Figure 5:
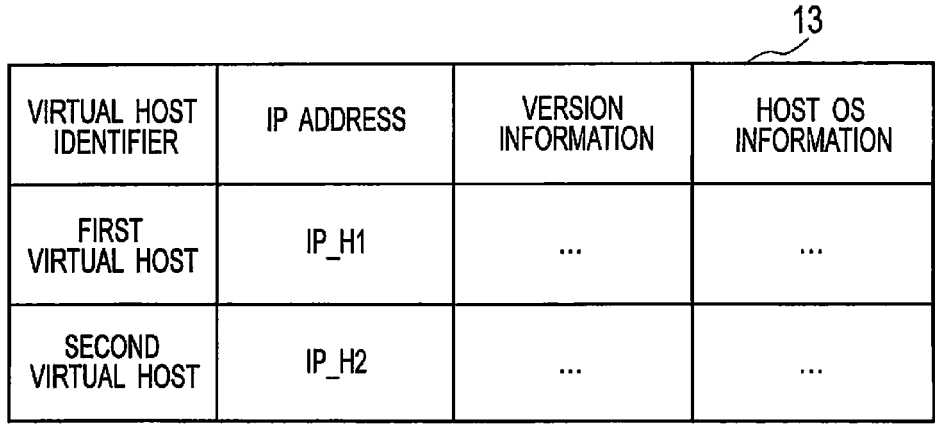
FIG. 5 is a diagram describing an example of the data structure and data contents of virtual host list data in the power supply according to the embodiment of the present invention.

The virtual host list data 13 is data containing the identifier of the virtual host computer 2 fed with power from the power supply 1. As shown in FIG. 5, the virtual host list data 13 is data in which the identifier of the virtual host 2 is associated with the IP address, version information, host OS information, and the like of this virtual host 2. In the virtual host list data 13, the identifier of the virtual host 2 may further be associated with a user name and a password for accessing the virtual host 2.

Figure 6:
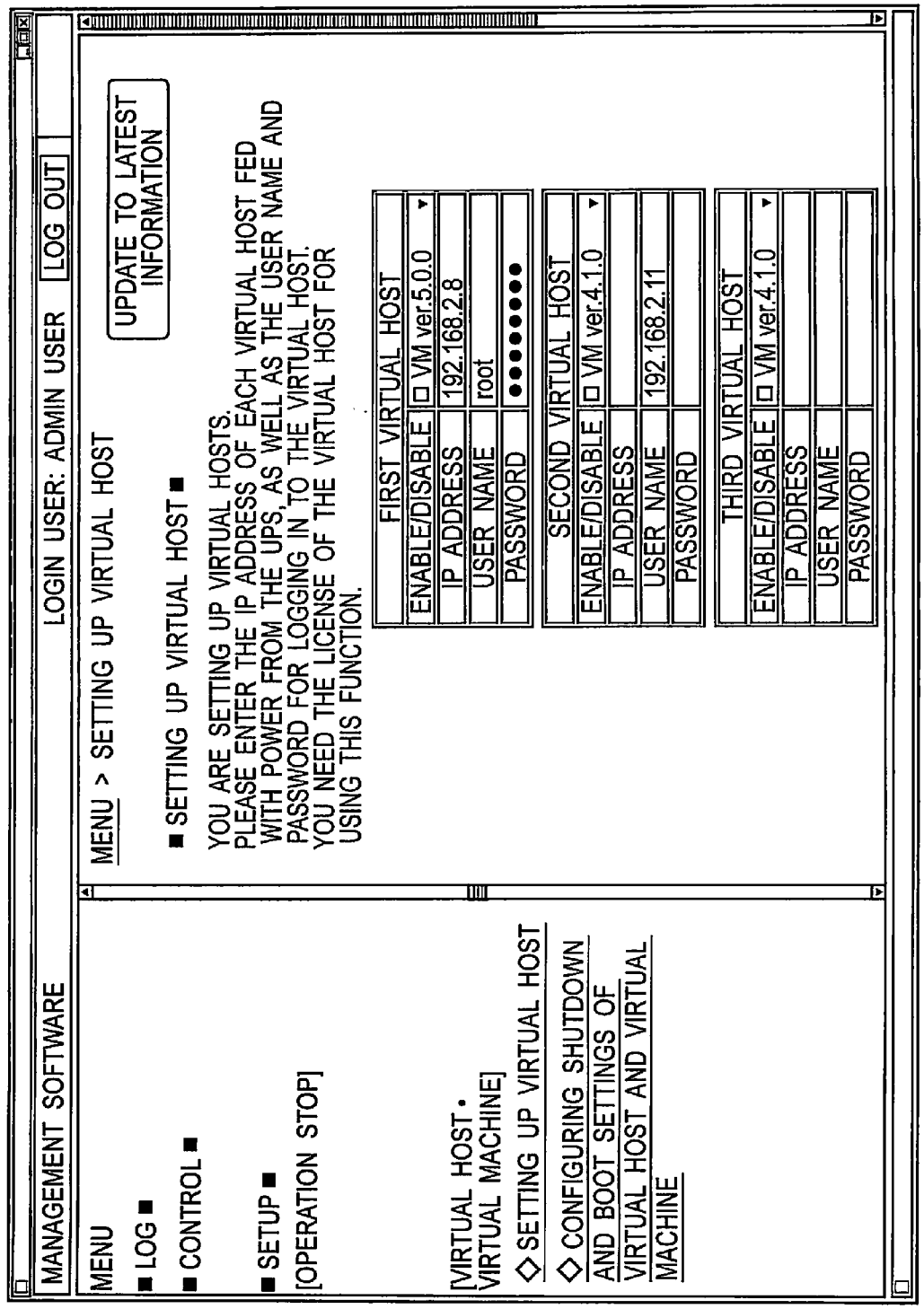
FIG. 6 is an example of a screen for registering virtual hosts in the case of the power supply according to the embodiment of the present invention.

The virtual host identifiers and the IP addresses in the virtual host list data 13 may be inputted in advance by the user through a screen shown in FIG. 6 or the like, for example. FIG. 6 is a screen in which the user inputs the information on each virtual host 2 to be fed with power from the power supply 1. The screen shown in FIG. 6 may be displayed on a display of the power supply 1 or displayed on a display of the power management apparatus 5 connected to the power supply 1.

The user inputs the IP address, user name, and password of each virtual host 2 in the screen shown in FIG. 6. The power supply 1 acquires the information inputted in the screen shown in FIG. 6 and creates the virtual host list data 13. Here, the user name and password of each virtual host 2 are set as appropriate so that the user can log in to the virtual host 2 to control its VM or to acquire information on the VM.

The controller 20 includes a power management unit 21, a VM management unit 22, a VM state acquisition unit 23, and a VM state sending unit 24. The controller 20 is configured to control processing of each of these units. The controller 20 is a so-called embedded computer and differs from a CPU used in general computers.

The power management unit 21 is configured to control the feed of power to the virtual hosts 2 by instructing the power feed unit 30 on the basis of the power management data 11. The power management unit 21 feeds power by following a condition set in advance for each outlet. Moreover, during a normal state, the power management unit 21 is supplied with power from an external power source to charge a storage battery and feeds power to each outlet. In the event of a power failure, the power management unit 21 feeds power to each outlet from the storage battery.

The VM management unit 22 is configured to manage the VM 3 run in emulation by the virtual host 2 fed with power from the power supply 1, on the basis of the VM management data 12. In the case of the first power supply 1a in FIG. 1A, the management targets of the VM management unit 22 are the first VM 3a, the second VM 3b, and the third VM 3c run in emulation by the first virtual host 2a, and the fourth VM 3d run in emulation by the second virtual host 2b.

In particular, the VM management unit 22 according to the embodiment of the present invention inputs commands a command related to the virtual power source of the VM 3. The "command related to the virtual power source of the VM 3" is a command to start or stop the running of the VM 3, and is specifically a command related to power necessary for running the VM 3 such as a boot, reboot, shutdown, power on, or power off.

For example, upon detection of the occurrence of a power failure, the VM management unit 22 outputs a shutdown command to the management target VM 3. As a result, resources such as a CPU and a memory for the VM 3 are freed. This reduces the virtual power necessary for running the VM to zero and thus provides a condition for a shutdown of the virtual host 2.

The VM state acquisition unit 23 is configured to create the VM management data 12 shown in FIG. 4 for the virtual host 2 fed with power from the power supply 1, by connecting to the virtual host 2 and acquiring information on the VM 3 run in emulation by the virtual host 2. In the example shown in FIG. 1A, the virtual hosts 2 fed with power from the first power supply 1*a* are the first virtual host 2*a* and the second virtual host 2*b*.

The VM state acquisition unit 23 sends each virtual host computer 2 in the virtual host list data 13 a request to acquire the information on each VM 3 run in emulation by the virtual host computer 2. From each virtual host computer 2, the VM state acquisition unit 23 acquires the information on each VM 3 run in emulation by the virtual host computer 2. The VM state acquisition unit 23 creates the VM management data 12 in which the identifier of the virtual host computer 2, the identifier of the VM 3, and the acquired information on the VM 3 are associated with each other, and stores the VM management data 12 in the memory 10.

Here, it is desirable that the VM state acquisition unit 23 create the VM management data 12 at a predetermined cycle. For example, the VM state acquisition unit 23 may send each virtual host 2 a request to acquire the information on its VM 3 after the elapse of a predetermined period of time since the creation of the VM management data 12.

Here, the VM state acquisition unit 23 may provide a thread which sends each virtual host 2 a request to acquire the information on its VM 3 and acquires the information on the VM 3.

For example, suppose that the virtual host list data 13 contains the identifier of the first virtual host computer 2*a* and the identifier of the second virtual host computer 2*b*.

In this case, the VM state acquisition unit 23 creates a first thread and a second thread. The first thread is a thread for acquiring the information on each VM run in emulation by the first virtual host computer 2*a* from the first virtual host computer 2*a*. The second thread is a thread for acquiring the information on each virtual machine run in emulation by the second virtual host computer 2*b* from the second virtual host computer 2*b*.

The VM state acquisition unit 23 acquires the information on the VM run in emulation by the first virtual host computer 2*a* in the first thread. Further, the VM state acquisition unit 23 acquires the information on the VM run in emulation by the second virtual host computer 2*b* in the second thread. Thereafter, the VM state acquisition unit 23 creates the VM management data 12.

Referring to FIGS. 7A to 7C, description will be given of a cycle in which the VM state acquisition unit 23 acquires the information on VMs 3. The example shown in FIGS. 7A to 7C describes a case where polling is performed periodically to acquire the information on VMs. However, the present invention is not limited to this case. For example, the VM state acquisition unit 23 may execute one cycle of processes shown in FIGS. 7A to 7C when a certain condition such as the occurrence of a power failure is met.

FIG. 7A describes one cycle of polling. The VM state acquisition unit 23, after the previous creation of the VM management data 12, provides a sleep time equal to a predetermined period of time t in W1. After the elapse of the predetermined period of time t, the VM state acquisition unit 23 creates a first thread T1 for the first virtual host 2*a* and a second thread T2 for the second virtual host 2*b*. In W2, the VM state acquisition unit 23 waits for the end of each thread, i.e. until the processing of the first thread T1 and the second thread T2 is finished.

The first thread T1 first acquires a VM list from the first virtual host 2*a* in W21, and then accesses each VM on the VM list acquired in W21 to acquire their VM information in W22. Likewise, the second thread T2 first acquires a VM list from the second virtual host 2*b* in W23, and then accesses each VM 3 on the VM list acquired in W23 to acquire their VM information in W24.

Referring to FIG. 7B, description will be given of the operation for acquiring the VM list from the first virtual host 2*a* in W21. First, in W211, the first thread T1 acquires the IP address of the first virtual host 2*a* from the virtual host list data 13, accesses https://<IP address>/mob, and acquires the version information, host OS information, and the like on the first virtual host 2*a*. The virtual host list data 13 may be updated with the acquired information. Then, after a sleep for a predetermined period of time in W212, the VM state acquisition unit 23 accesses https://<IP address>/mob?moid=ha-folder-vm and acquires the identifier of each VM run in emulation by the first virtual host 2*a* in W213.

Referring to FIG. 7C, description will be given of the operation for acquiring the information on each VM run in emulation by the first virtual host 2*a*. The first thread T1 connects to each VM 3 acquired in W213 and acquires the information on each VM. Here, assume that N VMs have been acquired in W213. In W221, based on the identifier of the first VM on the VM list, the first thread T1 accesses https://<IP address>/mob?moid=<VM identifier>&doPath=summary. The first thread T1 acquires the information on the first VM such as the VM name, IP address, running status, number of CPUs, memory capacity, OS name, etc. of the first VM. Then, after a sleep for a predetermined period of time in W222, based on the identifier of the second VM on the VM list, the first thread T1 accesses https://<IP address>/mob?moid=<VM identifier>&doPath=summary in W223. The first thread T1 acquires the information on the second VM such as the VM name, IP address, running status, number of CPUs, memory capacity, OS name, etc. of the second VM. The processing of this thread is finished once the VM information is acquired as described above for all the VMs on the VM list acquired in W213.

Like FIGS. 7B and 7C, the second thread T2 acquires the information on each VM run in emulation by the second virtual host 2*b*.

Note that although the above example has described the case where the VM information is acquired using HTTPS, the present invention is not limited to this case. Any protocol such for example as HTTP, SOAP, or SSH may be used instead.

Once the processing of the first thread T1 and the second thread T2 is finished, the VM state acquisition unit 23 performs a termination process in W3. Specifically, the VM state acquisition unit 23 creates the VM management data 12 on the basis of the information on the VMs acquired by the first thread T1 and the second thread T2 and stores the VM management data 12 in the memory 10. Thereafter, after the elapse of a sleep time equal to the predetermined period of time t, the VM state acquisition unit 23 acquires again the information on the VMs of the virtual hosts 2.

Figure 8:
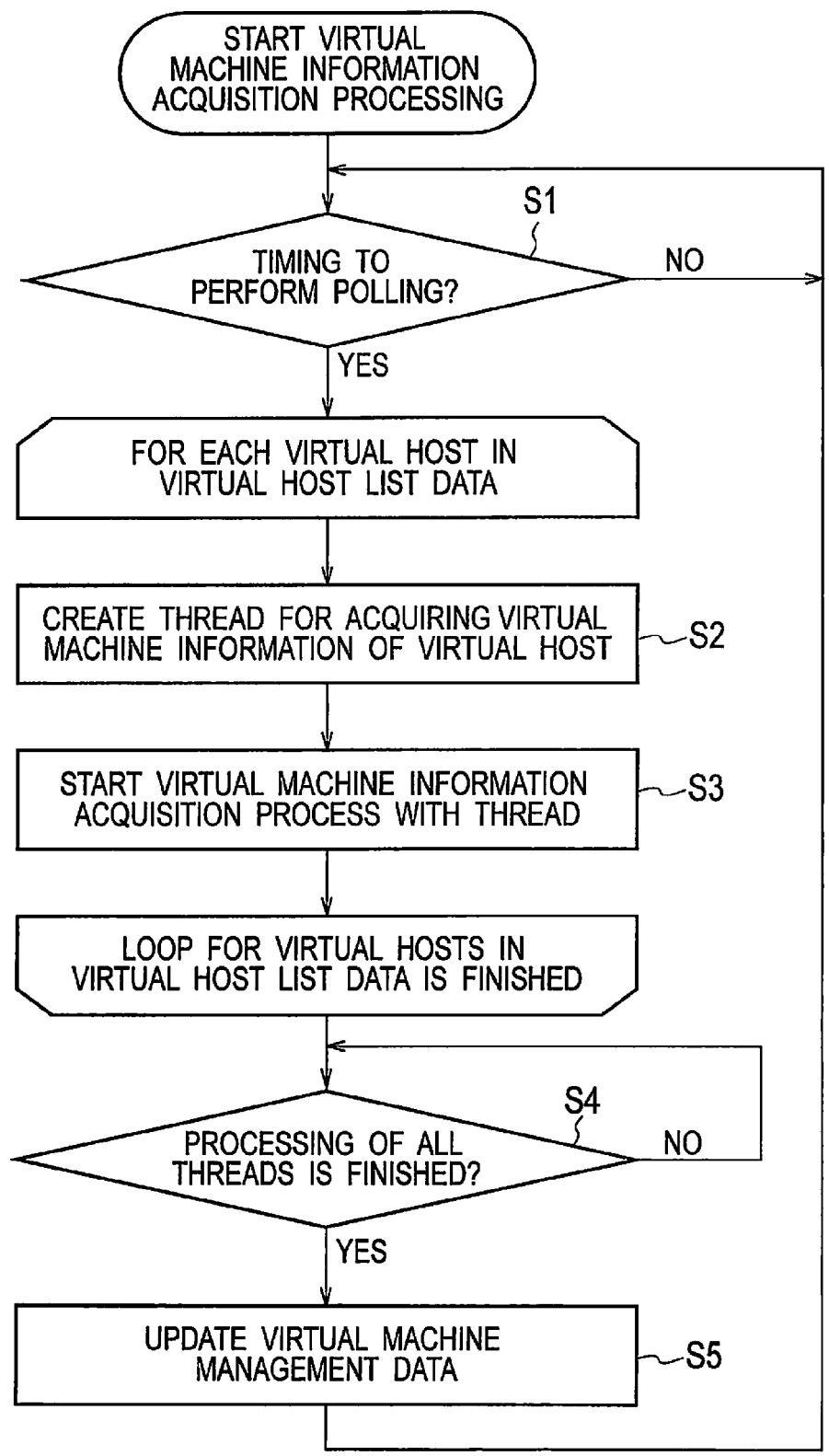
FIG. 8 is a flowchart describing processing of a VM state acquisition unit in the power supply according to the embodiment of the present invention.
Figure 9:
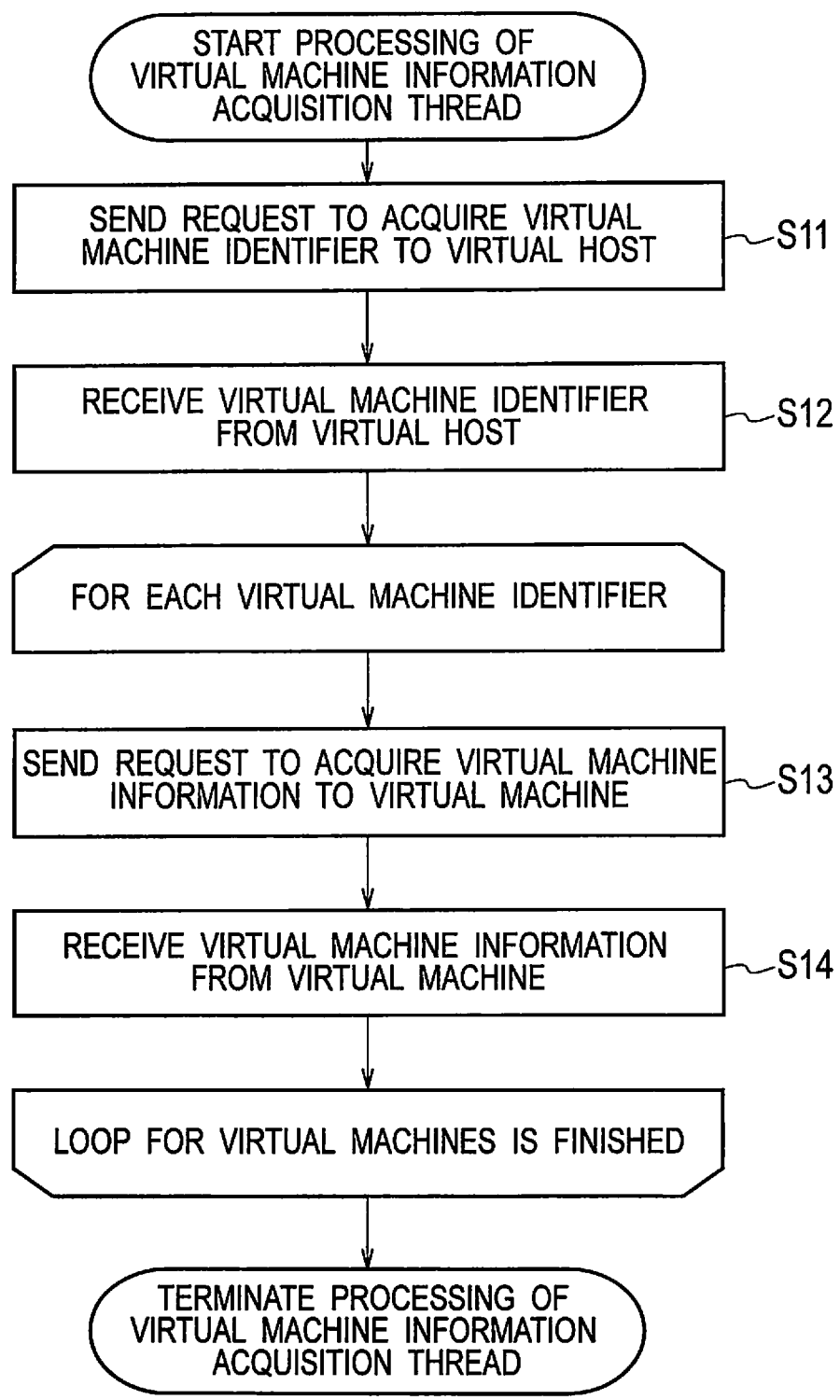
FIG. 9 is a flowchart describing how a thread created by the VM state acquisition unit is processed in the power supply according to the embodiment of the present invention.

Referring to FIGS. 8 and 9, description will be given of the VM state acquisition processing by the VM state acquisition unit 23 according to the embodiment of the present invention.

First, in step S1, the VM state acquisition unit 23 determines whether or not it is the timing to perform the polling. Specifically, the VM state acquisition unit 23 determines whether or not the predetermined period of time t has elapsed since the creation of the last VM management data 12. If the predetermined period of time t has not yet elapsed, the VM state acquisition unit 23 waits for the predetermined period of time t to elapse. Alternatively, the VM state acquisition unit 23 may perform the polling upon occurrence of a power failure.

If the predetermined period of time t has elapsed, the VM state acquisition unit 23 iterates processes of steps S2 and S3 for each virtual host in the virtual host list data 13. In step S2, the VM state acquisition unit 23 creates a thread for acquiring the VM information of the virtual host 2 and, in step S3, starts the process with the thread created in step S2.

Once the processes of step S2 and S3 are finished for each virtual host in the virtual host list data 13, the VM state acquisition unit 23 determines in step S4 whether the processing of all the threads is finished. If the processing of all the threads is not yet finished, the VM state acquisition unit 23 waits for the processing to be finished. Once the processing of all the threads is finished, the VM state acquisition unit 23 creates the VM management data 12 and stores it in the memory 10 in step S5.

Referring to FIG. 9, description will be given of the processing of the thread created in step S2.

First, in step S11, the VM state acquisition unit 23 sends the virtual host 2 a request to acquire the identifier of each VM run in emulation by the virtual host 2. In step S12, the VM state acquisition unit 23 receives the VM identifier.

The VM state acquisition unit 23 iterates processes of step S13 and S14 for each VM identifier received in step S12. The VM state acquisition unit 23 sends the VM 3 a request to acquire the VM information thereon in step S13 and receives the VM information in step S14.

Once the processes of step S13 and S14 are finished for each VM identifier acquired in step S12, the VM state acquisition unit 23 terminates the processing of this thread.

The VM state sending unit 24 is configured to send the VM management data 12 to an external terminal such as the power management apparatus 5. By receiving the VM management data 12, the power management apparatus 5 can figure out the latest information on the VMs in the virtual system 9, display that information to the user, and receive user commands for the VMs 3.

As described above, the power supply 1 according to the embodiment of the present invention can figure out the information on the VM run in emulation by the virtual host 2, by performing the polling on the virtual host 2 periodically or at a timing at which a certain condition is met. In this way, the power supply 1 can acquire the information on the VM 3 even if the virtualization management server 4 controls the virtual system 9.

Specifically, even in the event of a sudden power failure, the power supply 1 can send a command to shut down the virtual power source of the VM 3 and then send a command to shut down the physical power source of the virtual host 2 running this VM in emulation. Thus, because a shutdown command is sent from the power supply 1 to the VM 3 and the virtual host 2 even in the event of a sudden power failure, it is possible to protect data in the VM 3 and the virtual host 2 and shut them down easily and safely.

Moreover, the power supply 1 holds the data on the virtual host 2 and the VM 3. This allows the administrator of the power supply 1 to collectively manage apparatuses whose power feed needs to be managed. With such a power supply 1, it is possible to easily implement system construction, system operation, and maintenance.

OTHER EMBODIMENTS

Although the description has been given using the embodiment of the present invention, it should not be understood that the statement and drawings constituting part of this disclosure limit this invention. Various alternative embodiments, examples, and operation techniques become apparent to those skilled in the art from this disclosure.

For example, the sequence of the processes presented in the embodiment is a mere example, and may be changed as long as the change does not cause contradiction.

Moreover, in the embodiment of the present invention, the power management apparatus 5 is described as a general computer with a given program installed therein. However, the present invention is not limited to this case. The power management apparatus 5 may be a computer such as what is called a power management box designed for management of one or more power supplies 1.

The present invention includes various embodiments and the like that are not described herein, as a matter of course. Therefore, the technical scope of the present invention shall be determined solely by the specified matters in the invention according to the claims that are appropriate from the above description.

What is claimed is:

1. A power supply which feeds power to virtual host computers each running a virtual machine in emulation, the virtual machine controlled by a virtualization management server, the power supply comprising:
   a storage device configured to store virtual host list data containing an identifier of each of the virtual host computers fed with power from the power supply;
   a virtual machine state acquisition unit configured to
      send each of the virtual host computers in the virtual host list data a request to acquire information on the virtual machine run in emulation by the virtual host computer,
      acquire, from each of the virtual host computers, the information on the virtual machine run in emulation by the virtual host computer, and
      create virtual machine management data in which the identifier of the virtual host computer, an identifier of the virtual machine thereof, and the acquired information on the virtual machine are associated with each other; and
   a virtual machine management unit configured to read the virtual machine management data and send a set of commands, wherein the set of commands includes: (i) a command to, in an event of a sudden power failure, shut down the virtual power source of the virtual machine specified in the virtual machine management data, and (ii) a command to shut down a physical power source of the virtual host computer running the specified virtual machine in emulation after sending the command to shut down the virtual power source,
   wherein the power supply is employed in a system including a virtualization management server, and the virtualization management server executes migration of the virtual machine and does not control shut down of the virtual machine.

2. The power supply according to claim 1, wherein
   when the virtual host list data contains the identifier of a first virtual host computer and the identifier of a second virtual host computer,
      the virtual machine state acquisition unit creates a first thread for acquiring the information on the virtual machine run in emulation by the first virtual host computer from the first virtual host computer, and a second thread for acquiring the information on the virtual machine run in emulation by the second virtual host computer from the second virtual host computer, and the virtual machine state acquisition unit acquires the information on the virtual machine run in emulation by the first virtual host computer in the first thread, acquires the information on the virtual machine run in emulation by the second virtual host computer in the second thread, and thereafter creates the virtual machine management data.

3. A program being on a non-transitory computer-readable storage medium for a power supply which feeds power to virtual host computers each running a virtual machine in emulation, the virtual machine controlled by a virtualization management server, the program configured to execute the steps of:

sending a request to acquire information on the virtual machines run in emulation by the virtual host computers found in virtual host list data, the virtual host list data containing an identifier of each of the virtual host computers fed with power;

acquiring, from each of the virtual host computers, the information on the virtual machine run in emulation by the virtual host computer, and creating virtual machine management data in which the identifier of the virtual host computer, an identifier of the virtual machine thereof, and the acquired information on the virtual machine are associated with each other; and reading the virtual machine management data and send a set of commands, wherein the set of commands includes: (i) a command to, in an event of a sudden power failure, shut down the virtual power source of the virtual machine specified in the virtual machine management data, and (ii) a command to shut down a physical power source of the virtual host computer running the specified virtual machine in emulation after sending the command to shut down the virtual power sources, wherein the power supply is employed in a system including a virtualization management server, and the virtualization management server executes migration of the virtual machine and does not control shut down of the virtual machine.

4. The program according to claim 3, wherein when the virtual host list data contains the identifier of a first virtual host computer and the identifier of a second virtual host computer, the step of sending the acquisition request includes creating a first thread for acquiring the information on the virtual machine run in emulation by the first virtual host computer from the first virtual host computer, and a second thread for acquiring the information on the virtual machine run in emulation by the second virtual host computer from the second virtual host computer, and the step of creating the virtual machine management data includes acquiring the information on the virtual machine run in emulation by the first virtual host computer in the first thread, acquiring the information on the virtual machine run in emulation by the second virtual host computer in the second thread, and thereafter creating the virtual machine management data.

5. A power supply which feeds power to virtual host computers each running a virtual machine in emulation, the virtual machine controlled by a virtualization management server, the power supply comprising:

a storage device configured to store virtual host list data containing an identifier of each of the virtual host computers fed with power from the power supply;

a virtual machine state acquisition circuitry configured to send each of the virtual host computers in the virtual host list data a request to acquire information on the virtual machine run in emulation by the virtual host computer, acquire, from each of the virtual host computers, the information on the virtual machine run in emulation by the virtual host computer, and create virtual machine management data in which the identifier of the virtual host computer, an identifier of the virtual machine thereof, and the acquired information on the virtual machine are associated with each other; and a virtual machine management circuitry configured to read the virtual machine management data and send a set of commands, wherein the set of commands includes: (i) a command to, in an event of a sudden power failure, shut down the virtual power source of the virtual machine specified in the virtual machine management data, and (ii) a command to shut down a physical power source of the virtual host computer running the specified virtual machine in emulation after sending the command to shut down the virtual power source, wherein the power supply is employed in a system including a virtualization management server, and the virtualization management server executes migration of the virtual machine and does not control shut down of the virtual machine.

6. The power supply according to claim 5, wherein when the virtual host list data contains the identifier of a first virtual host computer and the identifier of a second virtual host computer, the virtual machine state acquisition circuitry creates a first thread for acquiring the information on the virtual machine run in emulation by the first virtual host computer from the first virtual host computer, and a second thread for acquiring the information on the virtual machine run in emulation by the second virtual host computer from the second virtual host computer, and the virtual machine state acquisition circuitry acquires the information on the virtual machine run in emulation by the first virtual host computer in the first thread, acquires the information on the virtual machine run in emulation by the second virtual host computer in the second thread, and thereafter creates the virtual machine management data.

* * * * *